Patented June 1, 1926.

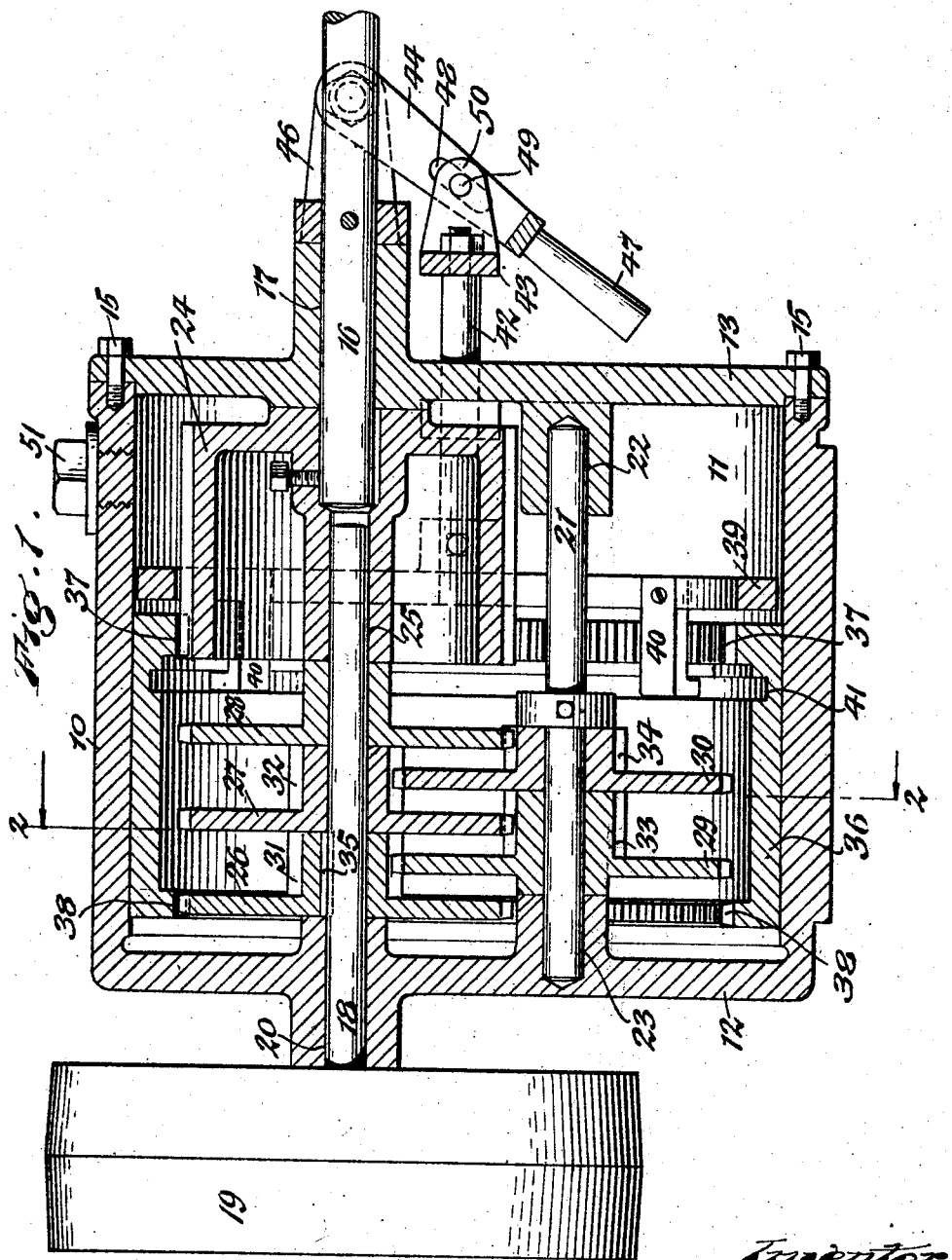

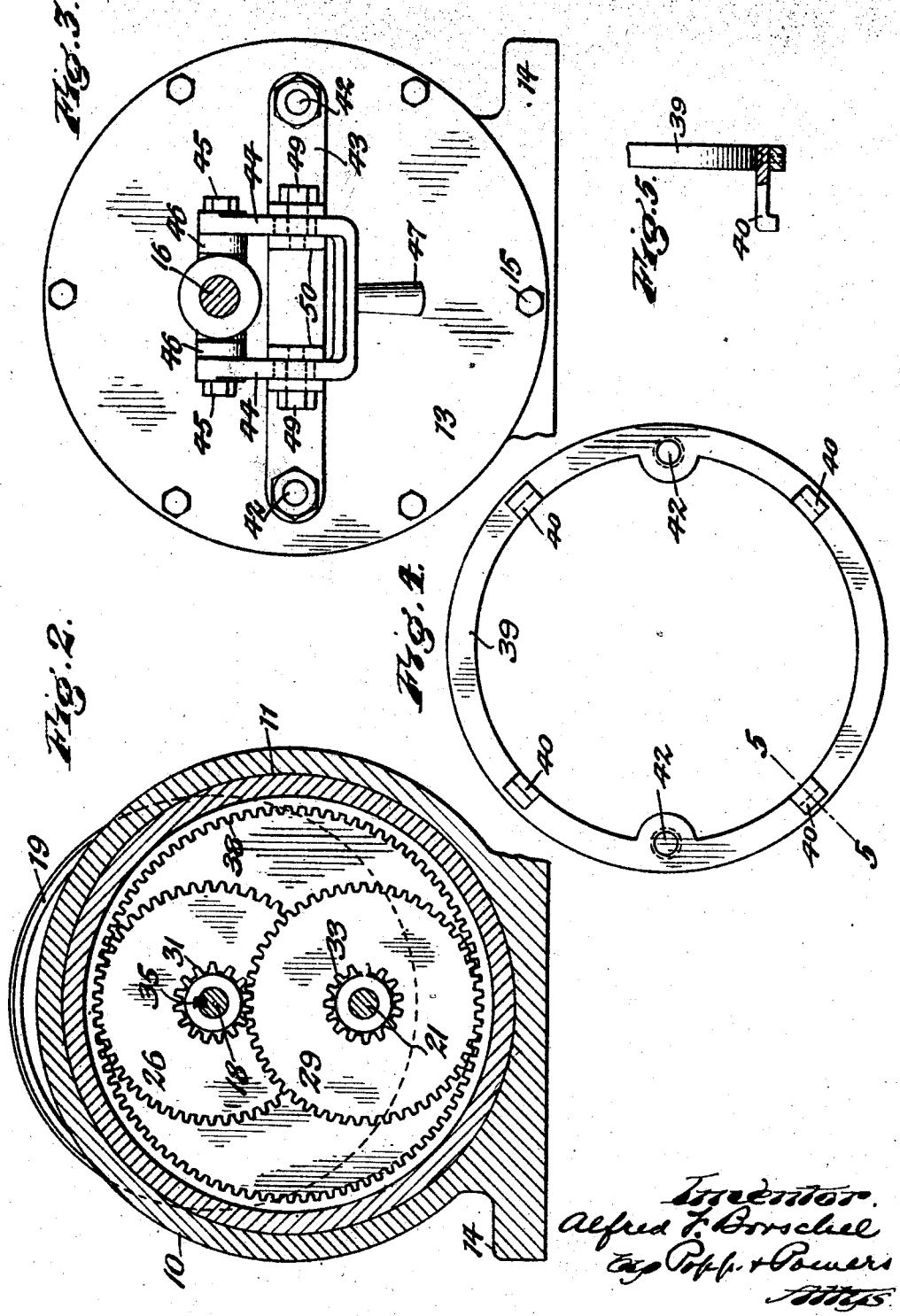

1,587,278

UNITED STATES PATENT OFFICE.

ALFRED F. BORSCHEL, OF BUFFALO, NEW YORK.

CHANGE-SPEED GEARING.

Application filed January 30, 1926. Serial No. 85,009.

This invention relates to a change speed gearing and has for its object the production of a gearing which is simple and compact in construction, efficient and reliable in operation and permits of ready and quick changing from one speed to another with ease and facility.

In the accompanying drawings:

Figure 1 is a longitudinal section of the preferred embodiment of my invention.

Figure 2 is a vertical cross section of the same taken on line 2—2 Fig. 1.

Figure 3 is an end elevation of the same partly in section.

Figure 4 is a side view of the yoke forming part of the shipper mechanism whereby the gears are changed from one speed to another.

Figure 5 is a fragmentary section taken on line 5—5 Fig. 4.

Similar characters of reference indicate like parts in the several views.

The main frame of this change speed gearing may be of any suitable construction in order to support the several working parts, but in the approved form of the same shown in the drawings this frame comprises a tubular body or shell 10 which is provided internally with the longitudinal cylindrical bore 11 adapted to form a bearing, heads 12 and 13 arranged on the high speed and low speed ends of this body and flanges 14 arranged on opposite sides of the body and adapted to receive bolts or similar fastenings for securing the frame to a stationary support. The head 12 at the high speed end of the casing or body is preferably formed integrally therewith, but the other head 13 at the low speed end of the casing or body is preferably made detachable therefrom and connected by means of bolts 15 or other suitable fastenings with the respective end of the frame body.

The numeral 16 represents the low speed shaft which in the present instance will be assumed to be the driven shaft and is journaled lengthwise in a bearing 17 on the low speed head 13 of the frame. The numeral 18 represents the high speed shaft which in the present case is assumed to be a driving shaft and receives its motion from any suitable source for instance by means of a driving belt passing around a pulley 19 at the outer end of this shaft. The high speed shaft 18 is arranged axially in line with the driven or low speed shaft 16 and is journaled in a bearing 20 on the head 12. The numeral 21 represents a counter-shaft or rod which is arranged within the frame parallel to the driving and driven shafts 18, 16 and has its opposite ends supported in lugs 22, 23 arranged on the inner sides of the heads 13 and 12, as shown in Fig. 1.

The numeral 24 represents an elongated gear wheel which is secured to the inner end of the low speed shaft 16 and has the inner end of its hub provided with a bearing 25 which receives the inner end of the high speed shaft 18 so that this gear wheel in effect serves as a bearing for the respective end of the high speed shaft.

On the transversely opposite parts of the high speed shaft and the counter-shaft are arranged the gear wheels of a train of which different members are selected for producing a variation in the speed of the driving or high speed and the driven or low speed shafts. In the preferred form of this train of gearing the same consists of a plurality of large gear wheels 26, 27, 28 mounted on the high speed shaft, a plurality of large gear wheels 29, 30 mounted on the counter-shaft, a plurality of small gear wheels 31, 32 mounted on the high speed shaft and turning respectively with the large high speed gear wheels 26 and 27 and meshing with the large gear wheels 29 and 30, and two small counter gear wheels 33, 24 turning respectively with the large counter gear wheels 29 and 30 and meshing with the large high speed gear wheels 27 and 28, as shown in Fig. 1. The primary high speed gear wheel 26 and its companion small gear wheel 31 are connected with the high speed shaft 18 by a key 35 or other suitable means so as to turn therewith, but the remaining gear wheels 27, 28 and 32 are mounted loosely on this shaft so as to be capable of turning independently thereof. Each of the large counter gear wheels 29 and 30 and the small counter gear wheels 33 and 34 connected respectively therewith, are also mounted loosely on the counter-shaft or rod 21 so as to be capable of turning independently of each other. Two groups or rows of gear wheels are therefore produced by this organization, the axes of these two rows being arranged parallel and lengthwise of the main frame.

The elongated gear wheel 24 and the several large gear wheels 26, 27 and 28 are preferably of the same pitch diameter as shown in the drawings.

A coupling gearing is provided whereby motion may be transmitted from the periphery of any one of the large gear wheels 26, 27, 28, 29 or 30 to the elongated gear 24, or vice versa for the purpose of varying the relative speed of the high and low speed shafts. In the preferred construction this is accomplished by a mechanism which comprises a rotary coupling barrel 36 which turns in the bore or bearing 11 of the main frame and is also capable of longitudinal movement thereon, a low speed internal gear rim 37 arranged at the rear end of the barrel 36 and meshing constantly with the teeth on the periphery of the elongated gear wheel 24 and also capable of sliding lengthwise thereon into different positions, and an internal high speed gear rim 38 arranged at the front end of the barrel 36 and adapted to mesh selectively with the outer parts of any one of the large gear wheels 26, 27, 28, 29 or 30. As shown in Fig. 1 of the drawings the coupling barrel 36 is in its foremost position in which its high speed gear rim 38 meshes with the large gear wheel 26 in which position the maximum speed can be transmitted from the high speed shaft 18 to the low speed shaft 16 due to the engagement of the low speed gear rim 37 engaging with the elongated gear 24 and the elimination of the remaining gears 27 to 34 from active service at this time. Upon moving the coupling barrel 36 backwardly one step the high speed gear rim 38 is disengaged from the gear wheel 26 and no motion is transmitted at this time from the high speed shaft to the low speed shaft. Upon, however, moving the coupling barrel 36 backwardly another step the opposite side of the high speed internal gear 38 will be engaged with the teeth of the first large counter-gear wheel 29, whereby motion will be transmitted at a reduced speed from the high speed shaft 18 to the low speed shaft 16 inasmuch as the motion at this time is transmitted successively from the high speed shaft to the coupling barrel 36 through the medium of the small gear wheel 31 and the large gear wheel 29. A further rearward step will disengage the gear rim 38 from the large gear wheel 29, but the next rearward step of this barrel will cause the gear rim 38 to be engaged with the large gear wheel 27. When this occurs the motion from the high speed shaft to the low speed shaft is again reduced due to introduction of the small gear wheel 33 and the large gear wheel 27 in the active train of gears. Another backward step of the coupling barrel will disengage the gear rim 38 from the gear wheel 27 and during a further backward step of the coupling barrel its gear rim 38 is engaged with the large gear wheel 30 whereby the small gear wheel or pinion 32 and the large gear wheel 30 are rendered operative in the train and cause a still further reduction in the speed from the driving shaft 18 to the driven shaft 16.

During the next rearward step of the coupling barrel 36 its gear rim 38 is disengaged from the large gear wheel 30 and a still further backward movement of the same will cause the gear rim 38 to mesh with the teeth of the large gear wheel 28, whereby the small gear wheel 34 and the large gear wheel 28 are rendered active and caused to transmit speed at a still further reduced rate from the high speed to the low speed shaft.

The number of cooperating small and large wheels may be either reduced or increased in number as compared with the number shown in the drawings, the selection of the particular number of pairs of cooperating gear wheels being determined by the particular use for which the gearing is intended. Obviously the rate of speed can be gradually stepped up from one speed to a higher speed if the mechanism is organized so that the low speed shaft 16 is the driving shaft and the high speed shaft 18 is the driven shaft. During all these various changes in speed the low speed gear rim 37 remains constantly in mesh with the teeth of the elongated gear wheel 28.

Various means may be employed for shifting the coupling barrel from one position to another those shown in the drawings being suitable and constructed as follows.

The numeral 39 is a yoke having preferably the form of a ring and movable longitudinally within the rear part of the frame. This yoke is provided with a plurality of forwardly projecting hooks 40 which engage with an internal annular groove 41 in the rear part of the coupling barrel 36, whereby the latter is compelled to move lengthwise with the yoke 39 but is free to turn independently thereof. This yoke is mounted on the inner ends of two longitudinal shifting rods 42 which are guided in the rear head 13 of the frame and have their outer ends connected by a cross bar 43. A shifting lever turning about a horizontal transverse axis is arranged externally of the main frame and operatively connected with the same and the yoke 39. In the preferred construction this rock lever is constructed in the form of a fork with two arms 44 which are pivotally connected at their upper ends by means of pivots 45 with brackets 46 projecting rearwardly from the rear head 13 of the frame on opposite sides of the low speed shaft 16 while the lower end of this lever is provided with a handle 47, and the intermediate part of each of the arms 44 is provided with a longitudinal slot 48 which receives a coupling bolt 49 connecting two rearwardly projecting lugs 50 on the cross bar 43. Upon swinging the shifting lever 47 forwardly or backwardly the yoke 39 together with the coupling barrel 36 is moved lengthwise of the frame, whereby the high speed gear rim 38 of this barrel may be engaged with any one of the large gear wheels 26 to 30 of the train, for varying the relative speed of the driving and driven shafts and also to interrupt the driving connection between the high and low speed shafts at different points in the train when desired.

If desired the interior of the casing may be filled with a grease or other lubricant so that the gears will run noiselessly and also with a minimum amount of friction and wear, thereby rendering it unnecessary to replace the gears frequently. Such lubricant may be introduced into the enclosing casing through an opening in the top of the same which is normally closed by a plug 51.

This change speed gearing is very compact so that the same can be readily installed in places where only a limited amount of space is available. It is also very simple and durable in construction so that it is not likely to get out of order.

I claim as my invention:

1. A change speed gearing comprising an elongated gear wheel, a train consisting of a plurality of large and small gears arranged in a plurality of longitudinal rows, each row containing alternating large and small gear wheels, and each small gear wheel of one row meshing with a large gear wheel of the other row, and a longitudinally movable barrel having two internal gear rims one of which meshes constantly with the elongated gear wheel and the other is adapted to engage selectively with the outer parts of the large gear wheels of said rows.

2. A change speed gearing comprising an elongated gear wheel, a train consisting of a plurality of large and small gears arranged in a plurality of longitudinal rows, each row containing alternating large and small gear wheels, and each small gear wheel of one row meshing with a large gear wheel of the other row, a longitudinally movable barrel having two internal gear rims one of which meshes constantly with the elongated gear wheel and the other adapted to engage selectively with the outer part of the large gear wheels of said rows, shafts connected with the elongated gear wheel and the outer endmost gear of said train, and a frame on which said shafts, gear wheels and barrel are journaled.

3. A change speed gearing comprising an elongated gear wheel, a train consisting of a plurality of large and small gears arranged in a plurality of longitudinal rows, each row containing alternating large and small gear wheels, and each small gear wheel of one row meshing with a large gear wheel of the other row, a longitudinally movable barrel having two internal gear rims one of which meshes constantly with the elongated gear wheel and the other adapted to engage selectively with the outer parts of the large gear wheels of said rows, shafts connected with the elongated gear wheel and the outer endmost gear of said train, a frame on which said shafts, gear wheels and barrel are journaled, and shipper means for shifting said barrel lengthwise mounted on said frame and connected with said barrel to compel the latter and the shipper means to move together lengthwise but permitting the barrel to turn independently of said shipper means.

4. A change speed gearing comprising an elongated gear wheel, a train consisting of a plurality of large and small gears arranged in a plurality of longitudinal rows, each row containing alternating large and small gear wheels, and each small gear wheel of one row meshing with a large gear wheel of the other row, a longitudinally movable barrel having two internal gear rims one of which meshes constantly with the elongated gear wheel and the other adapted to engage selectively with the outer parts of the large gear wheels of said rows, a shaft connected with the elongated gear wheel, a shaft connected with the outer endmost gear wheels of one row and loosely supporting the remaining gear wheels of the same row and arranged in line with said elongated gear wheel, a shaft upon which the gear wheels of the other row are mounted, a frame having a body provided with a bearing for said elongated gear wheel and heads for supporting said shafts and a shipper mechanism for shifting said gear barrel comprising a longitudinally movable yoke arranged within said frame, hooks arranged on said yoke, said barrel being provided with a groove which receives said hooks, shifting rods sliding in one of said heads and connected at their inner ends with said yoke, and a hand lever fulcrumed on said frame and pivotally connected with said shifting rods.

ALFRED F. BORSCHEL.